Dec. 13, 1938.   F. J. WESTROPE ET AL   2,140,122
AUXILIARY SEAT CONSTRUCTION
Filed Feb. 7, 1936   4 Sheets-Sheet 3
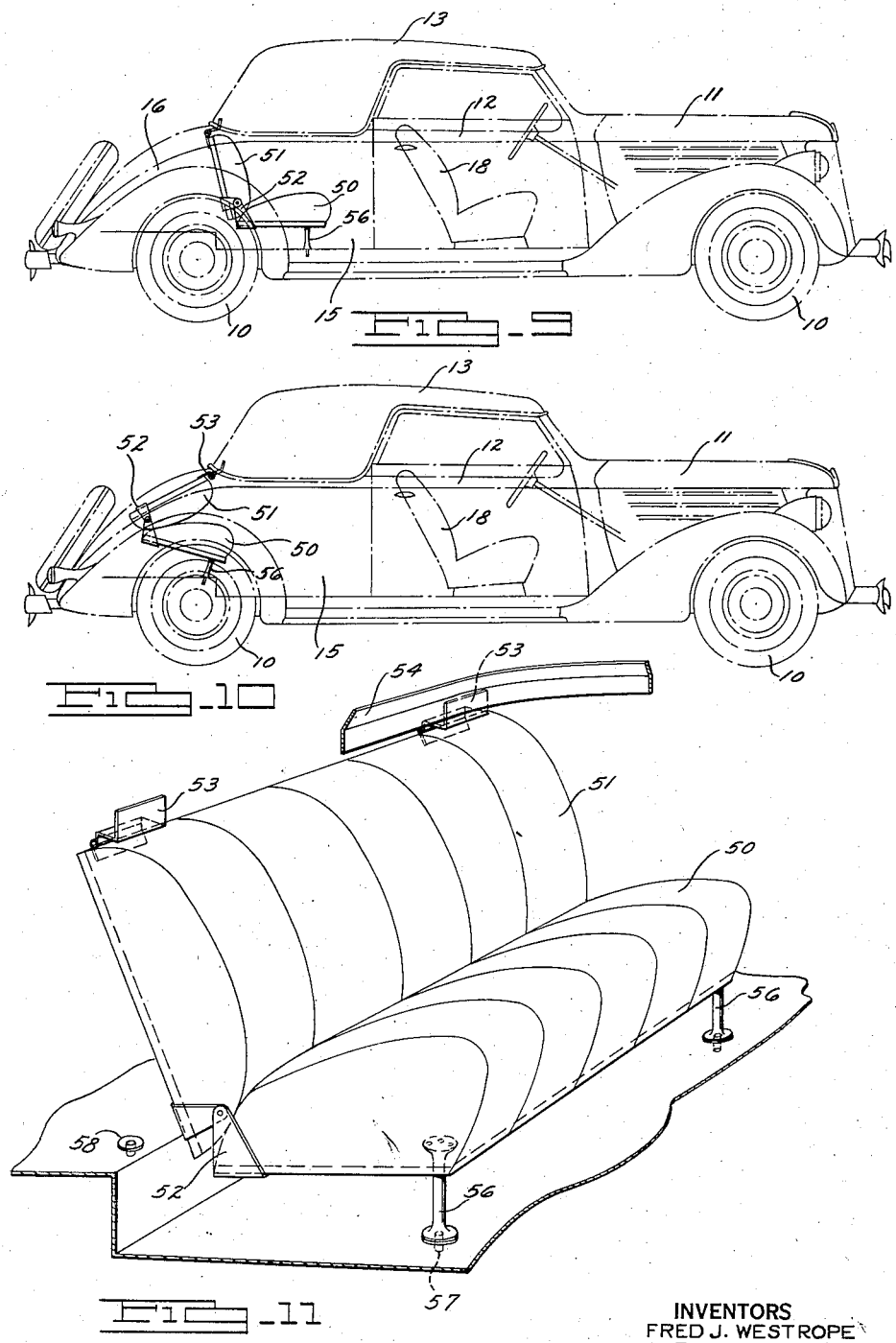
INVENTORS
FRED J. WESTROPE
ALFRED PERSON
BY ALFRED H. HABERSTUMP
Harness Dickey Pierce & Haun ATTYS

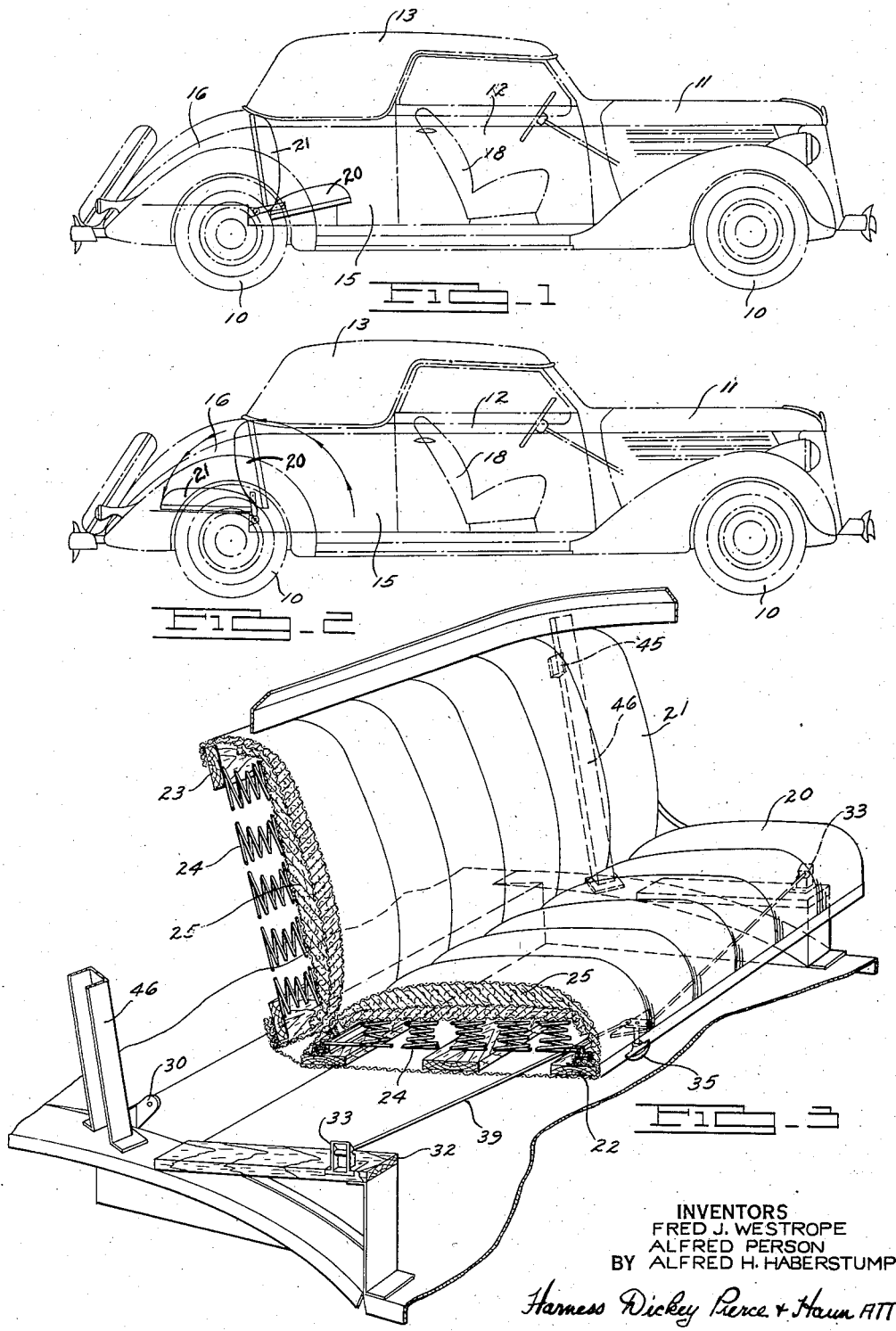

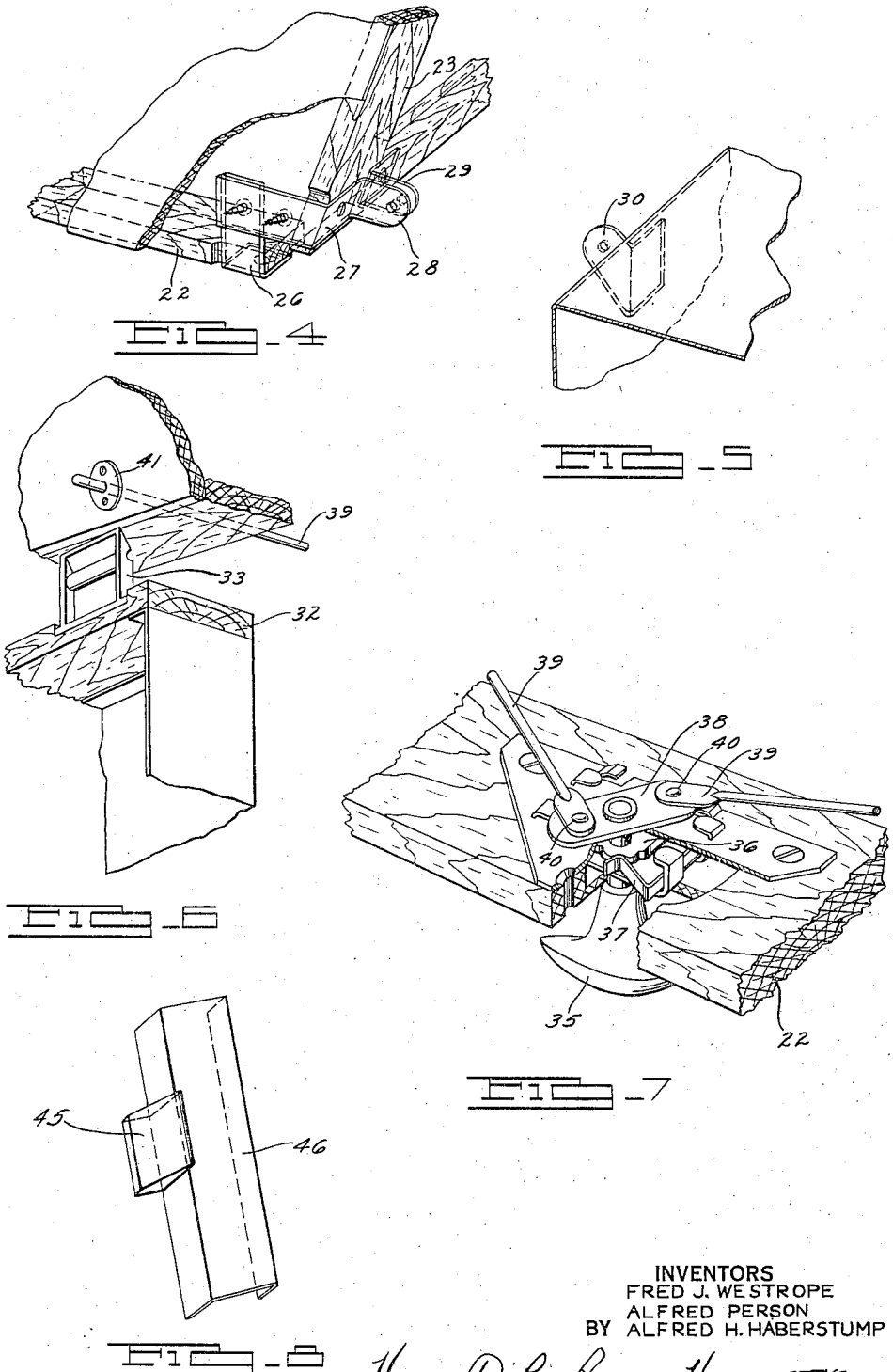

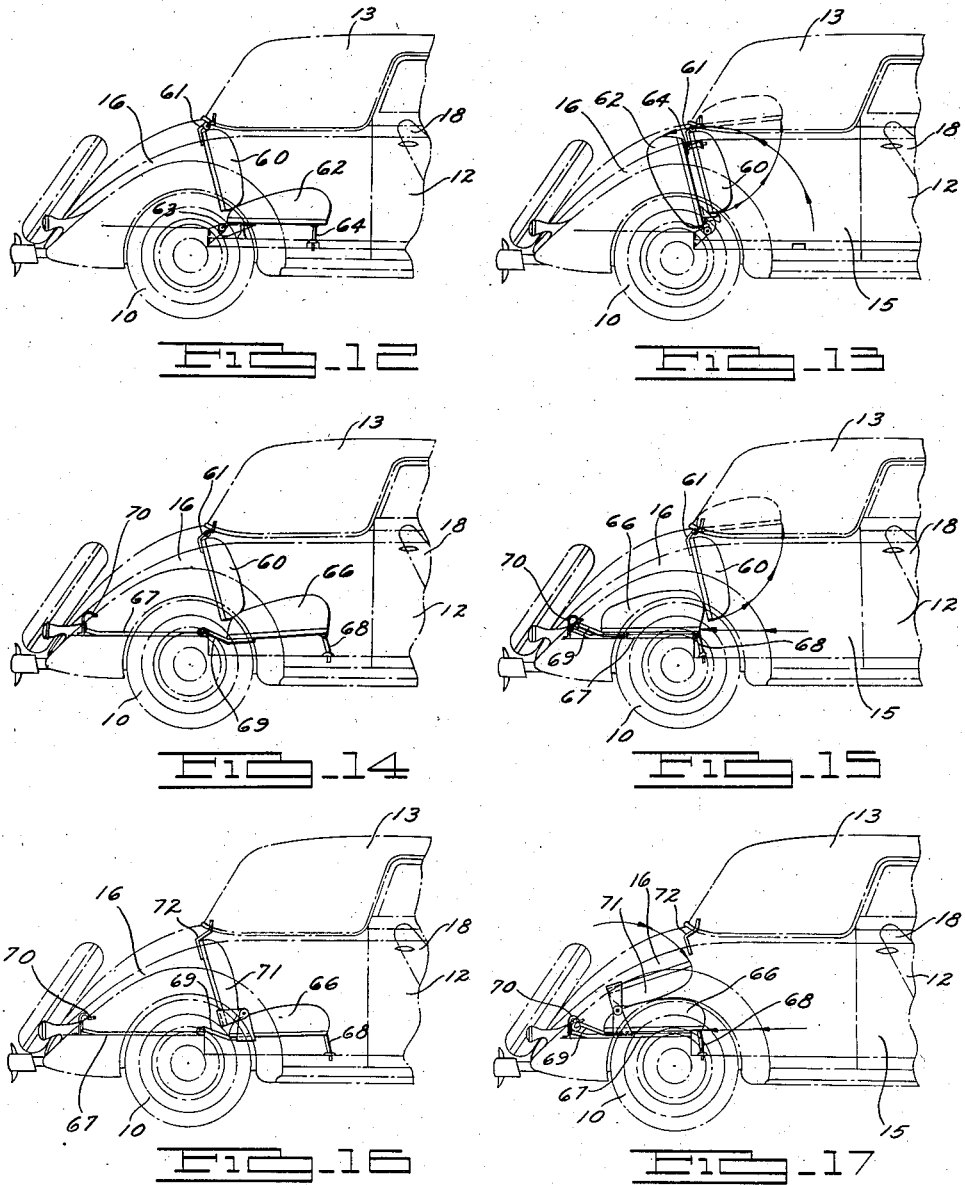

Patented Dec. 13, 1938

2,140,122

UNITED STATES PATENT OFFICE 2,140,122

AUXILIARY SEAT CONSTRUCTION

Fred J. Westrope, Alfred H. Haberstump, and Alfred Person, Detroit, Mich., assignors to The Murray Corporation of America, a corporation of Delaware Application February 7, 1936, Serial No. 62,758

5 Claims. (Cl. 296—65)

This invention relates to vehicle body constructions. More particularly it relates to a novel form of seat for optional use in automotive vehicle bodies.

The present invention is primarily directed to a vehicle body in which a seating compartment is provided which is considerably longer than is necessary for the accommodation of the usual conventional front seat, and which contains a back seat of novel form and construction which may be folded and disposed in the space rearwardly of the seating compartment in order that the substantial space rearwardly of the front seat may be used for storage or other desired purpose.

It is a still further object of the present invention to provide a folding seat construction adapted for use in this type of automotive vehicle which may be easily and quickly folded and stored and which is of a construction which does not sacrifice any of the comforts found in permanently mounted seat constructions.

The present invention contemplates the provision of a resilient seat cushion and seat back which are so constructed and arranged with respect to each other and to the body in which they are mounted, that they may be folded and moved pivotally rearwardly from an operative position within the seating compartment to an inoperative or stored position in the storage compartment to the rear of the seating compartment.

Yet another object of the present invention consists in the provision of novel and effective means for positioning the seat within the seating compartment and for locking the seat in folded position in the storage compartment.

Many other and further objects and advantages of the present invention will become apparent from the following specification when considered in connection with the accompanying drawings forming a part thereof.

In the drawings:

Figure 1 is a more or less diagrammatic side elevational view of an automobile having one form of the novel seat construction of the present invention mounted in operative position therein;

Fig. 2 is a side elevational view similar to Fig. 1 showing the auxiliary seat construction illustrated in Fig. 1 in inoperative or stored position;

Fig. 3 is an enlarged fragmentary perspective view with parts in section and parts broken away, illustrating one form of the improved seat construction and the manner in which it is mounted with respect to the frame of the vehicle;

Fig. 4 is an enlarged fragmentary, perspective view of one of the rear corners of the seat construction shown in Fig. 3 illustrating the manner in which this seat is pivotally connected to the frame of the body in which it is mounted;

Fig. 5 is a fragmentary, perspective view illustrating in detail the bracket for pivotally securing the seat to the vehicle body in which it is mounted;

Fig. 6 is an enlarged fragmentary, perspective view showing in detail the locking mechanism for accurately positioning the seat within the seating compartment and the means for locking the seat in operative position.

Fig. 7 is an enlarged fragmentary, perspective view with portions broken away showing in detail the latch operating mechanism carried by the seat cushion frame which serves to operate the latches shown in Fig. 6 for securing the seat in predetermined position;

Fig. 8 is an enlarged fragmentary, perspective view of one of the frame members of the vehicle body showing the mounting of the latch mechanism thereon for securing the seat as a whole, in inoperative position.

Figs. 9 and 10 illustrate a modified form of the invention, Fig. 9 illustrating the seat in operative position and Fig. 10 showing the seat in stored or inoperative position.

Fig. 11 is an enlarged fragmentary, perspective view illustrating in detail the mounting of the seat construction shown in Figs. 9 and 10 showing the seat positioned for use within the seating compartment of the vehicle;

Figs. 12 and 13 illustrate a still further modified form of the invention, Fig. 12 showing the seat in operative position and Fig. 13 showing the seat folded in inoperative position;

Figs. 14 and 15 illustrate a still further modified form of the invention, Fig. 14 showing the auxiliary seat in operative position within the seating compartment and Fig. 15 showing the seat in inoperative position within the storage compartment;

Figs. 16 and 17 illustrate a vehicle body embodying a still further modified form of auxiliary seat construction, Fig. 16 showing the seat in operative position within the seating compartment and Fig. 17 showing the seat in inoperative position within the storage compartment.

With more detailed reference to the drawings and particularly to the specific embodiment of the invention illustrated in Figs. 1 to 8 thereof, it will be appreciated that the particular type of automobile body with which this novel and improved seat construction shown herein may be used may be substantially varied without departing from the generic scope of the inventive concepts presented in this application.

By way of illustration we have shown in Fig. 1 a vehicle body of the two door type which has wheels 10, a hood 11, doors 12 and top 13. It will be appreciated that while the specific embodiment of the invention illustrated in Figs. 1 and 2 discloses a vehicle body having a convertible type of top cooperating with the windows in the doors to enclose the entire seating compartment of the body a permanently mounted top may be equally well utilized if desired.

The top 13 serves to enclose the seating compartment 15 of the body and it will be appreciated by reference to Figs. 1 and 2 that the body shown therein is generally streamlined in form and is provided rearwardly of the seating compartment with a tapered storage compartment 16. It is seen that access may be had to the seating compartment 15 by means of the doors 12 on either side of the vehicle and that access to the storage compartment may be had from the seating compartment.

As is conventional in structures of this kind the vehicle is provided with a pair of front seats 18 which may, if desired, be movably mounted in order to facilitate access to the rear portion of the seating compartment.

The auxiliary seat construction to which the present invention is primarily directed comprises a seat cushion 20 and a seat back 21. As is conventional in structures of this kind the cushion and the seat back comprise suitable frames 22 and 23 respectively which serve to support suitable resilient springs 24 which are in turn covered by suitable conventional upholstery 25.

In the form of the invention illustrated in Figs. 1 to 8 of the drawings the seat cushion 20 and seat back 21 are secured together by means of suitable brackets 26 and 27 which are secured directly to the frames 22 and 23 respectively in order that the seat cushion and seat back will be firmly positioned with respect to each other. The bracket member 27 is provided with an outturned end portion 28 which co-operates with an L-shaped bracket 29 to provide a pivotal mounting for the seat structure as a whole. The outturned members 28 and 29 are adapted to be disposed upon either side of and pivotally connected to a pivot bracket 30 permanently secured to the frame of the body of the vehicle. The seat structure is preferably provided with pivots such as have been described above at each of the rear corners of the seat back frame. And it will, consequently, be apparent that the seat structure as a whole may be swung about this pivot 30 and that such swinging movement will serve to move the seat cushion and back, bodily from an operative position in the seating compartment, such as is shown in Fig. 1, to an inoperative position within the storage compartment 16 such as is shown in Fig. 2. It will further be noted by reference to Figs. 1 and 2 that when the seat is in the operative position shown in Fig. 1 the back of the seat constitutes an effective closure between the seating compartment 15 and the storage compartment 16 and that when the seat is swung to the inoperative position the seat cushion serves to constitute an effective closure between these two compartments.

In order to provide clearance for the rear axle of the vehicle it is necessary that the floor of the storage compartment 16 be disposed at a somewhat higher level than the floor of the compartment 15. Consequently it is necessary to provide a suitable support for the seat structure when in operative position within the seating compartment 15. While it will be apparent that many and various means may be provided for supporting the seat within the seating compartment, we have shown by way of illustration a pair of longitudinally extending supports 32 which are adapted to engage the lateral edges of the cushion frame 22. These supports 32 may be mounted at such an angle as may be desired to position the cushion 20 at the proper inclination for comfortable use. Adjacent the outer edges thereof the supports 32 are each provided with inwardly presenting latches 33 which, as will hereinafter be more clearly seen, serve to cooperate with suitable means upon the cushion frame in order to lock the seat structure as a whole in position on the supports 32.

A latch handle 35 is journalled for rotation in the underside of the forward portion of the frame 22 of the seat cushion. The shaft of the latch handle 35 is provided with a star wheel 36 which has a cooperating spring 37 bearing against the star wheel in order that the handle 35 may be maintained in predetermined adjusted position. The upper end of the latch handle 35 has secured thereto a cross-arm 38 which has two laterally extending latch arms 39 pivotally connected thereto at points 40. These latch arms 39 pass through suitable bearing plates 41 in the end structure of the cushion frame and serve to engage the latches 33 described above. It will be apparent from the foregoing description that rotation of the latch handles 35 will serve to cause a lateral movement of the latch arms 39 and effect their engagement or disengagement with the latches 33 thus firmly locking the cushion in position upon the support 32. As was apparent from the description above that the relative position of the seat cushion and seat back is at all times maintained by means of the interconnecting brackets 26 and 27 and consequently it will be appreciated that when the seat cushion is locked in position the seat back will also be in operative position ready for use. Suitable latches 45 are provided upon the upwardly extending frame members 46 of the vehicle body and it will be seen that these latch members 45 serve to cooperate with the latch arm 39 to lock the seat cushion and seat back in inoperative position when the seat as a whole is swung into the storage compartment. It is, therefore, seen that effective means carried by the cushion frame are provided for not only locking the seat structure as a whole in operative position within the seating compartment but also for locking the seat structure as a whole in inoperative position within the storage compartment.

In the modified form of the invention illustrated in Figs. 9, 10 and 11 the novel form of seat structure shown therein comprises a seat cushion 50 and a seat back 51 pivotally connected together at their adjacent edges by means of suitable brackets 52. The upper marginal edge of the seat back member 51 is provided with a suitable pair of hinges 53 one member of which is secured permanently to the seat back member 51 and the other member thereof is permanently secured to one of the transversely extending body rails 54. It will, therefore, be seen that the seat disclosed in this embodiment of the invention comprises a pair of members which are not only pivotally connected together but which are pivotally connected to the frame of the body in which they are mounted.

The seat cushion structure 50 is provided on the lower side thereof with a pair of downwardly extending support pillars 56 which serve to engage suitable apertures 57 in the floor of the seat compartment in order to lock the seat structure as a whole in operative position within the seating compartment. It will be clear by reference to Fig. 11 that when the seat structure as a whole is mounted in operative position within the seating compartment it is supported solely by the hinge members 53 and the support members 56. Suitable apertures 58 are provided in the floor of the storage compartment which apertures are similar in construction to the apertures 57 adapted to receive the lower end of the supporting members 56. It will be apparent that when it is desired to store the seat, the cushion 50 and seat back 51 may be folded together and swung about the hinges 53 in order to move the seat structure as a whole bodily rearwardly into the storage compartment and the support members 56 may be seated in the recesses 58 in order to firmly lock the seat structure as a whole into position within the storage compartment.

In the modified form of the invention illustrated in Figs. 12 and 13 a back 16 is provided which is hinged by means of hinges 61 to the body of the vehicle. The seat cushion 62 which cooperates with the seat back 60 to form the novel auxiliary seat is pivotally connected by means of suitable hinge mechanism 63 to the frame of the vehicle and is provided at its forward edge with suitable support members 64 which serve to maintain the cushion in the desired position within the seating compartment. When it is desired to store the seat construction illustrated in Figs. 12 and 13 the cushion 16 may be swung forwardly as illustrated by the arrows in Fig. 13 and then the seat cushion 62 may be swung about its own independent pivot rearwardly into the storage compartment 16 and the seat back 60 may then be restored to its original position. In Figs. 14 and 15 we have shown a still further modified form of the invention in which a sliding cushion is substituted for the pivoted form of cushion construction illustrated in the preceding modification of the invention. In this form of the invention the seat back construction is substantially identical with that described in connection with Figs. 12 and 13 and the cushion construction comprises a cushion 66 which is mounted for longitudinal movement on a pair of trackway elements 67 and is provided at its forward edge with suitable supports 68 such as has been described above. The cushion frame is provided with suitable brackets 69 which serve to engage the trackway 67 and to control movement of the cushion therealong. The rear end of the trackway 67 is provided with a suitable hook 70 which serves to engage the brackets 69 to lock the cushion 66 in position at the end of its reward movement.

In the modified form of the invention illustrated in Figs. 16 and 17 the mounting of the cushion is substantially the same as that described in connection with the form of the invention shown in Figs. 14 and 15. This modification differs, however, from that just described in that the back 71 is pivotally connected to the seat cushion and the two move as a unit along the trackway 67. The frame of the vehicle is provided with suitable depending brackets 72 which serve to engage the rear side of the seat back 71 in order to control movement of this member when the seat structure as a whole is arranged in operative position such as is shown in Fig. 16. It will be apparent that folding of the seat back forwardly upon the cushion will lower the back sufficiently to pass underneath the bracket 72 when the seat structure as a whole is slid rearwardly into the seating compartment as is illustrated by the arrows in Fig. 17.

It will be appreciated that the modifications of the invention illustrated in the drawings described above are merely illustrative of some of the forms which the generic inventive concepts presented may take. Many other and further modifications falling within the scope of the subjoined claims will be apparent to those skilled in the art.

What we claim is:

1. In a vehicle body construction having a seating compartment and a storage compartment rearwardly of said seating compartment, an auxiliary seat construction comprising a seat cushion and a seat back member pivotally connected together for pivotal movement with respect to each other, means for pivotally connecting the upper marginal portion of said seat back member to said vehicle body whereby said seat back member and said seat cushion member may be bodily swung about said pivot to move said seat cushion member and seat back member from said seating compartment into said storage compartment.

2. In a vehicle body construction having a seating compartment and a storage compartment rearwardly of said seating compartment, an auxiliary seat construction comprising a seat cushion and a seat back member pivotally connected together for pivotal movement with respect to each other, means for pivotally connecting the upper marginal portion of said seat back member to said vehicle body whereby said seat back member and said seat cushion member may be bodily swung about said pivot to move said seat cushion member and seat back member from said seating compartment into said storage compartment, and means for retaining said seat cushion member in predetermined position in said seating compartment.

3. In a vehicle body construction having a seating compartment and a storage compartment rearwardly of said seating compartment, an auxiliary seat construction comprising a seat cushion and a seat back member pivotally connected together for pivotal movement with respect to each other, means for pivotally connecting the upper marginal portion of said seat back member to said vehicle body whereby said seat back member and said seat cushion member may be bodily swung about said pivot to move said seat cushion member and seat back member from said seating compartment into said storage compartment, means for retaining said seat cushion member and seat back member in predetermined position in said seating compartment, and means for retaining said members in predetermined position in said storage compartment.

4. In a vehicle body construction having a seating compartment and a storage compartment rearwardly of said seating compartment, an auxiliary seat construction comprising a seat cushion and a seat back member pivotally connected together for pivotal movement with respect to each other, means for pivotally connecting the upper marginal portion of said seat back member to said vehicle body whereby said seat back member and said seat cushion member may be bodily swung about said pivot to move said seat cushion member and seat back member from said seating compartment into said storage compartment, and a pair of downwardly projecting supports on said seat cushion member adapted to engage recesses in the floor of said seating compartment to retain said seat cushion member and seat back member in predetermined position therein.

5. In a vehicle body construction having a seating compartment and a storage compartment rearwardly of said seating compartment, an auxiliary seat construction comprising a seat cushion and a seat back member pivotally connected together for pivotal movement with respect to each other, means for pivotally connecting the upper marginal portion of said seat back member to said vehicle body whereby said seat back member and said seat cushion member may be bodily swung about said pivot to move said seat cushion member and seat back member from said seating compartment into said storage compartment, and a pair of downwardly projecting supports on said seat cushion member adapted to engage recesses in the floor of said seating compartment to retain said seat cushion member and seat back member in predetermined position therein, said storage compartment having recesses therein adapted to retain said seat cushion and seat back members in folded condition therein.

FRED J. WESTROPE.
ALFRED PERSON.
ALFRED H. HABERSTUMP.